United States Patent [19]
Edmunds et al.

[11] Patent Number: 5,592,602
[45] Date of Patent: Jan. 7, 1997

[54] USER INTERFACE AND METHOD FOR CONTROLLING AND DISPLAYING MULTIMEDIA MOTION, VISUAL, AND SOUND EFFECTS OF AN OBJECT ON A DISPLAY

[75] Inventors: Michael V. Edmunds; Kenneth E. MacKenzie; Joseph Dunn; A. Gordon Smith, all of San Francisco, Calif.; J. Paul Kase, Bar Harbor, Me.

[73] Assignee: Macromedia, Inc., San Francisco, Calif.

[21] Appl. No.: 243,964

[22] Filed: May 17, 1994

[51] Int. Cl.⁶ .................................................. G06T 13/00
[52] U.S. Cl. ........................................ 395/174; 395/349
[58] Field of Search ........................... 434/118; 395/152, 395/153, 154, 155, 156, 135

[56] References Cited

U.S. PATENT DOCUMENTS

| | | | |
|---|---|---|---|
| 4,988,981 | 1/1991 | Zimmerman et al. | 345/158 |
| 5,220,433 | 6/1993 | Mogamiya et al. | 358/310 |
| 5,261,041 | 11/1993 | Susman | 395/152 |
| 5,307,456 | 4/1994 | MacKay | 395/154 |
| 5,442,744 | 8/1995 | Piech et al. | 395/154 |
| 5,461,711 | 10/1995 | Wang et al. | 395/161 |
| 5,463,729 | 10/1995 | Kitaguchi et al. | 395/161 |
| 5,485,600 | 1/1996 | Joseph et al. | 395/161 X |

OTHER PUBLICATIONS

*Swivel 3D Professional*, 1990 by Young Harvill, pp. 3–3, 3–6, 3–7, 4–1, 4–2, 4–5.
*Mastering Windows 3.1* (Special Edition) by Robert Cwart 1993, p. 688.
Walker et al., SoundEdit Pro User Guide, 1991, pp. 4, 27–33, 64–67, 108–113.
Borland, Quattro Pro for Windows User's Guide, 1992, pp. 17–20, 198–199.
Guler, ROBOS: World Modelling Through and Object System, Advance Robotics 1992 Conf., pp. 1654–1657, Jun. 19, 1991.
Ohnishi, A Visual Software Requirements Definition Method, Proc. 1st Intl. Conf. Requirements Engineering, pp. 194–201, Apr. 18, 1992.
St. Denis, Specification By Example, System Sciences 1990 Annual Hawaii Intl Conf. pp. 237–246.
Halpert, Object Oriented Programming for Motion Control, Industry Applications Society 1991 Annual Meeting, pp. 1330–1340, Apr. 15, 1991.
Raskin, R., "Creating Multimedia To Die For", *PC Magazine* Feb. 22, 1994 pp. 209–251.

*Primary Examiner*—Heather R. Herndon
*Assistant Examiner*—Anton W. Fetting
*Attorney, Agent, or Firm*—Albert C. Smith; Edward J. Radlo

[57] ABSTRACT

A multimedia authoring program includes a multimedia effect tool for applying and controlling direction of motion, visual, and sound effects for multimedia objects, including text, graphics, and the like, in a multimedia art work. The tool provides a set of palettes, each including a plurality of icons representing different motion and visual effects. The effects are applied to an object in each of a number of time segments that partition the overall duration of the object. The time segments can be enlarged or reduced as desired. For some time segments, including an entry and an exit time segment, there is an associated motion direction and visual effect palette. The motion direction palette allows selection of an icon representing a particular motion that is applied to the object during the runtime of the multimedia art work, whereby the object moves in the selected direction during the associated time segment. The visual effect palette allows the selection of an icon representing a visual effect that is applied to alter the appearance of the object during the associated time segment. The hold time segment, during which the object is stationary, has a visual effect palette for applying visual effects useful during the stationary positioning of the object. A sound effect applied to the object is controlled with a cue control and an end control for adjusting the beginning and ending points of the sound effect relative to the appearance and disappearance of the object on the display.

31 Claims, 6 Drawing Sheets

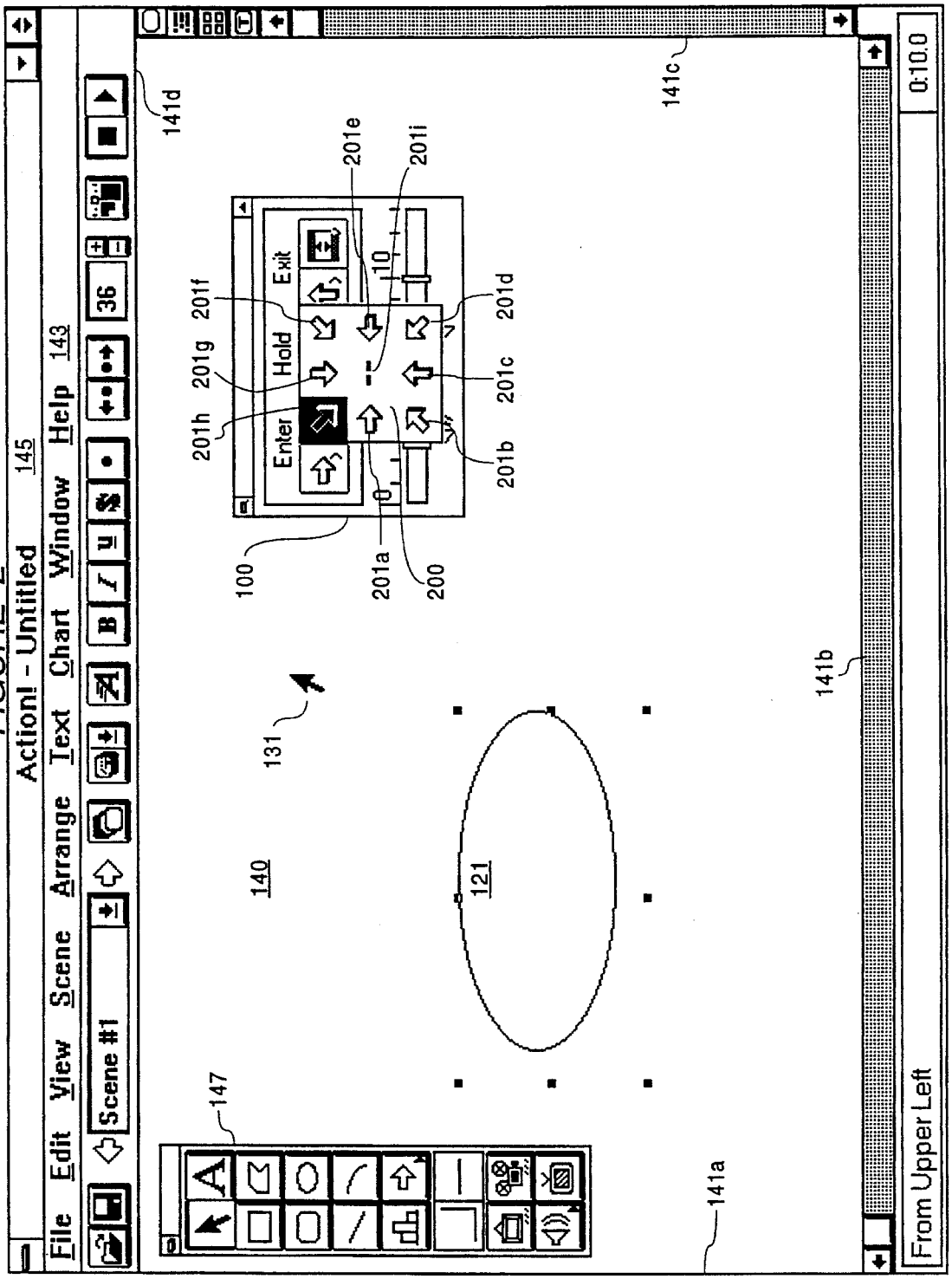

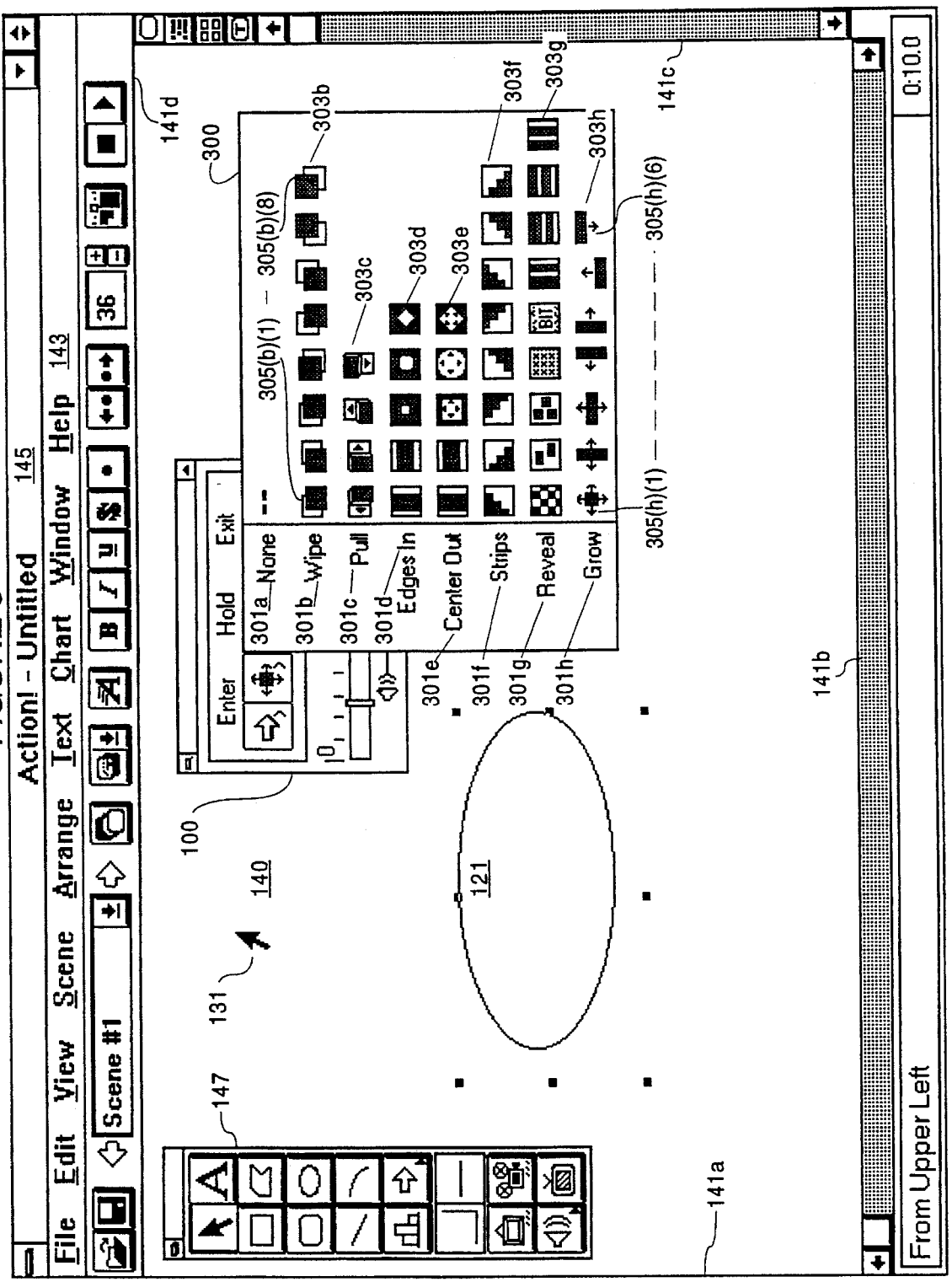

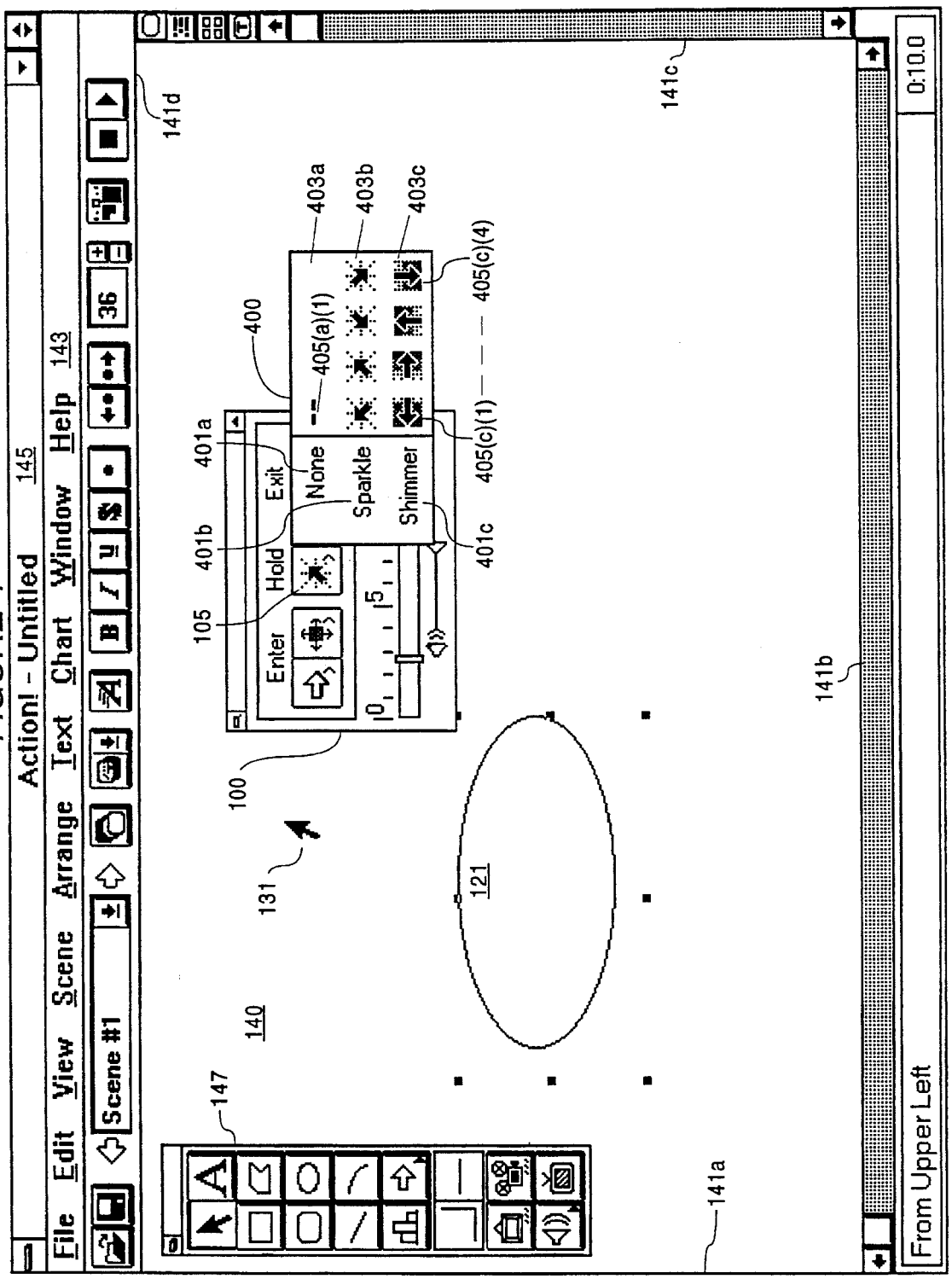

USER INTERFACE AND METHOD FOR CONTROLLING AND DISPLAYING MULTIMEDIA MOTION, VISUAL, AND SOUND EFFECTS OF AN OBJECT ON A DISPLAY

BACKGROUND

1. Field of the Invention

The present invention relates generally to the field of computer based multimedia authoring tools, and more particularly to authoring tools for manipulating screen objects during the authoring of multimedia art.

2. Description of the Background Art

A multimedia art work typically consists of interrelated graphic, sound, and text objects, which illustrate and convey the subject matter of work. The multimedia objects are typically combined with varying visual and audio effects that enhance the impact of the presentation. Motion effects are particularly important, as they can be used to convey complex relationships between objects over time, and highlight the content of the presentation. Associated with the motion or position of an object can be a visual effect, such a wipe, fade, reveal, and the like. These visual effects further enhance the motion or positioning of the object by focusing the viewer's attention on the object, and by providing a means for smoothly integrating various types of objects into a coordinated ensemble of images and text. Sound effects further enchance the multimedia art work, for example, associating a recording of an airplane's engine with a graphic image of such an engine.

Since a multimedia art work typically provides a changing array of images and objects, each object has an associated time duration that can be divided into any number of time segments. There are typically at least three main time segments: the appearance, or entry, of the object on the display, the hold or stationary positioning of the object, and the disappearance, or exit, of the object from the display. During its entry and exit on the display, the motion of the object needs to be controlled, generally with respect to a common reference, such as the boundary of the display. Thus, an object can, from a given point of entry on the display, move downward toward the bottom of the display, hold in a selected position on the display, and then exit by moving toward the right boundary. Likewise, associated with each time segment can be a visual effect. Thus, an object can enter from the left of the display, moving toward the center while fading in, then hold in the middle of the display while blinking, and then move toward the right of the display while having a vertical wipe applied. Such combinations of movement and visual effect can be applied to many different objects that are included in the multimedia art, resulting in a richly textured and visually dynamic work.

Accordingly, the complex combination of motion, direction, position, and visual effect must be coordinated by the multimedia artist to develop high quality multimedia art. Where there are various possible directions of movements, and numerous visual effects that can be applied, the artist needs a design tool that allows the rapid and flexible application of both motion and visual effects for a given multimedia object. Since the motion and visual effects are related to the time segments of an object's duration, it is desirable for a design tool allow the effects to be applied with respect to each time segment of an object's duration. Further, there is a need to control the beginning, or cue, and duration of sound effects associated with the object.

Conventional approaches to controlling the motion, visual, and audio effects of multimedia objects have generally not provided for the coordinated control of these effects. Typically, various different menus, screen prompts and other interface elements must be accessed and manipulated in specific sequences merely to apply a single effect to an object. For example, where a menu is used to set a motion effect for an object, the use must activate the menu, and then choose from a list of text items the name of the desired effect. The absence of a visual reference for the effect impairs the ease of use of the menu, and since the menu disappears after use, the artist typically has no way of determining the current motion direction setting other than selecting the menu again. Since there are at least six settings of interest (the motion direction and visual effect for each of the entry, hold and exit time segments), separating the controls for all of these functions into different menus means that the artist is unable to determine in a single glance, the settings for all of the effects, but rather, must activate numerous different menus.

Another problem is that the means for effecting each type of effect are unrelated, such as different menus or other interface elements, each for applying only a single type of effect, unrelated generally to a time segment, or another effect. Thus the artist must select from one menu or dialog box to apply a visual effect, and another unrelated menu to apply a motion effect to the same object. Because of the structural limitations of menus, there is no way for the menu to associate its effects with a particular time segment of the object's duration. This lack of integration means there is typically little direct relationship between applying an effect to an object and controlling the time segment to which the visual effect or motion effect applies.

It is desirable therefore to provide a multimedia art design tool that effectively integrates the application of motion and visual effects with the various time segments of an object's duration on the display.

SUMMARY OF THE INVENTION

The above described problems are addressed by a user interface element in a multimedia authoring program that consolidates and integrates the control of motion, visual, and sound effects of multimedia object. The invention includes user interface apparatus comprising a set of motion direction icons and visual effect icons, where each motion effect icon represents a motion with a direction that can be applied to a multimedia object, and each visual effect icon, likewise represents a visual effect that can be applied to the object. The icons are selected by an electronic pointing device. Responsive to the motion direction icons are motion direction setting instructions that apply the motion represented by a selected motion direction icon to the object; similarly a visual effect setting instructions apply a visual effect represented by a selected visual effect icon.

The motion direction and visual effect icons are further arrayed on palettes. The visual effect icons are arranged into array having various visual effect families, each family including those visual effect icons having a common type of visual effect. A motion effect indicator icon indicates the selected motion direction icon, and a visual effect indicator icon indicates the selected visual effect icon are displayed on the display to inform the artist of the current setting for each motion and visual effect.

In addition, where the object has a time duration, the user interface comprises an apparatus for segmenting the object's duration into a plurality of time segments, where each time segment has a beginning and an ending time partition, and a segment duration, and is associated with a visual effect applied by the visual effect setting instructions, a first means for adjusting the duration of a first and third time segment adjacent to a second time segment by moving the second time segment itself towards one of the adjacent time segments, and a second means for adjusting the duration of a time segment by moving a time partition separating two time segments. With the first means the duration of the second time segment is held constant, and the durations of the adjacent time segments are increased and decreased according to the direction and amount of movement. With the second means, the duration of the time segment is increased in the direction of movement of the time partition. Where there are various time segments for an object, there is an entry and exit time segment, each of which is associated with a motion applied by the motion direction setting means to the object. Further, a hold time segment can be associated with the stationary position of the object on the display.

For controlling and applying sound effects to an object, the user interface further comprises a cue point adjusting icon for adjusting on the display a cue point for a stored sound effect, and storing the cue point with the object in a memory, and an end point adjusting icon for adjusting the end point of the sound effect, and storing the end point in memory with the object. These icons allow controlling when a sound effect begins, or when it ends with respect to the duration of an object on the display.

A method for controlling an object to apply motion direction, visual, and sound effects, includes selecting the object with the electronic pointing device, displaying a first palette having a set of motion direction icons, selecting a motion direction icon on the first palette, applying the motion with a direction represented by the selected motion direction icon to the object, and then moving the object on the display in the direction represented by the selected motion direction icon.

Further the method includes displaying a second palette having a set of visual effect icons, selecting a visual effect icon on the second palette, and then applying the selected visual effect to the object. Where each object includes an object duration having various time segments, the method further includes adjusting the segment durations of a first and third time segment by moving a second time segment adjacent to both the first and third time segments, and adjusting the segment durations of two adjacent time segments by moving a time partition separating the time segments along the axis.

The method also includes displaying on the display a cue point for a sound effect that is applied to the object, adjusting on the display a cue point, storing the adjusted cue point in association with the sound effect; displaying an end point of the sound effect, adjusting the end point, and storing the end point in association with the sound effect.

The above features of the invention provide various benefits to the multimedia artist during the creation of multimedia art works. The palettes including the motion direction and visual effect icons allow immediate application of effects to the object, in a much more direct manner than conventional menus or dialog boxes that need to be separately invoked and manipulated. The display of icons indicating the currently selected motion direction and visual effect allow immediate determination of the status of effects of an object in each of the significant time segments. The integration of the control of object motion, direction, visual effect, sound effects and time segments into a modeless control tool further provides for increased ease of use and speed of application of a variety of multimedia effects.

BRIEF DESCRIPTION OF THE DRAWINGS

FIG. 2 is an illustration of the motion effects palette 200;

FIG. 3 is an illustration of the motion visual effects palette 300;

FIG. 4 is an illustration of the hold visual effect palette 400; and

DESCRIPTION OF THE PREFERRED EMBODIMENT

Figure 1A:
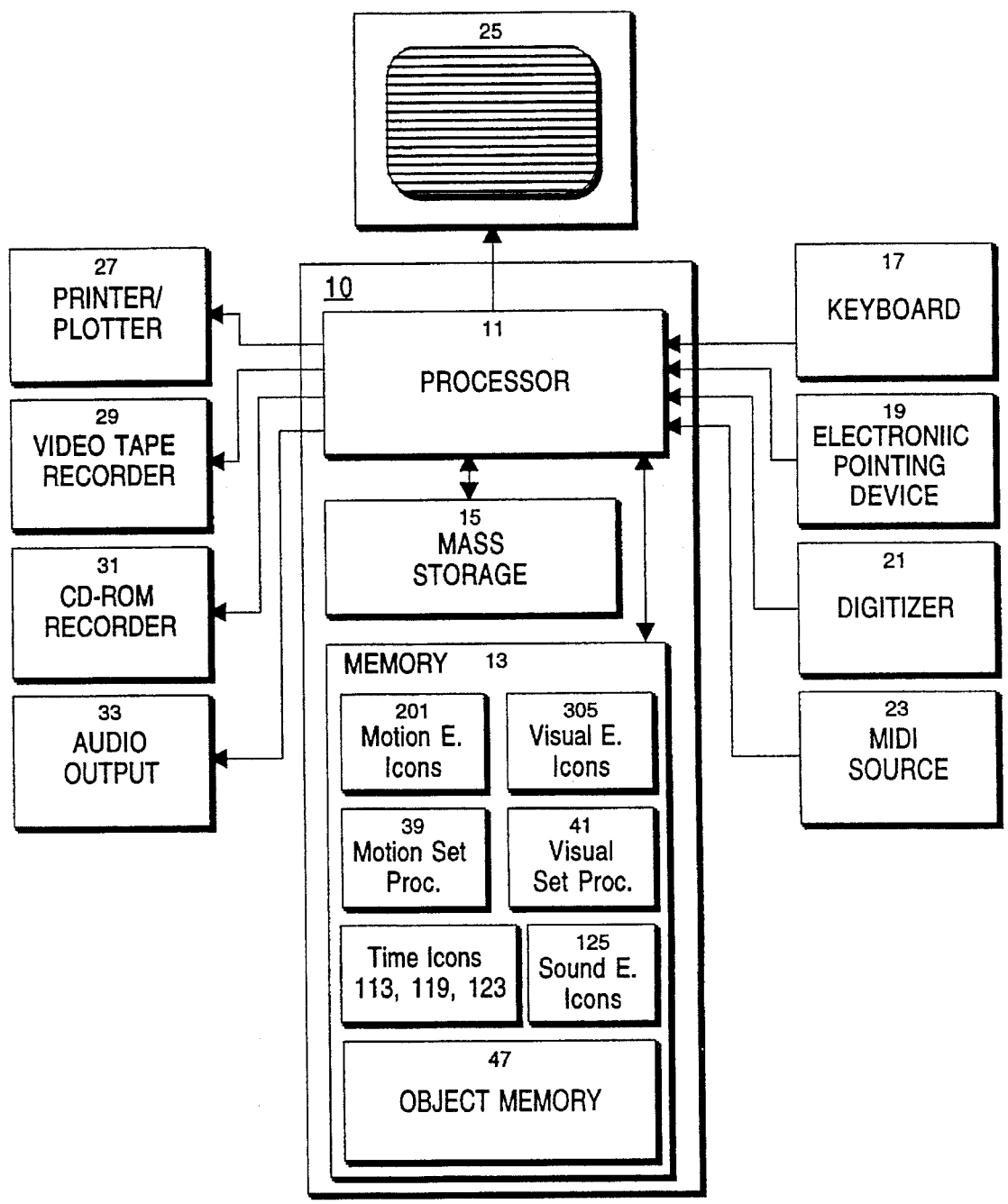
FIG. 1A is a block diagram of a multimedia authoring system for use with the present invention.

Referring now to FIG. 1A, there is shown a multimedia authoring system incorporating the present invention. FIG. 1A shows a computer system including a computer 10 having a processor 11, a mass storage device 15, and an addressable memory 13. The mass storage device 15 permanently stores program files, including a multimedia authoring program incorporating the multimedia effect tool of the present invention, and data files, including multimedia art works created with multimedia authoring program.

The addressable memory 13 is used to load the multimedia authoring program for operation by the processor 11 during the creation of a multimedia art work, and for temporarily storing the art work during its creation. The memory 13 also stores during program operation, icons 201 representative of motion effects, icons 305 representative of visual effects, a motion setting procedure 39 for applying a motion effect to an object, and a visual effect setting procedure 41 for applying a visual effect to an object. The memory 13 also stores icons 113, 119, 123 representing the time segments, and related time elements of an object, and icons 125 representing the sound effect controls. These icons and procedures are accessed by the processor 11 as needed for the display and control of the object. The memory 13 also stores data for each of the objects in the art work, including the motion, visual, and sound effects associated with the objects.

The processor 11 receives inputs from a variety of different sources useful in the creation of a multimedia art work. A keyboard 17 is used to input commands and data for controlling the operation of the processor 11 and the multimedia authoring program in a conventional manner, and for providing textual content for a multimedia art work. Also coupled to the processor 11 is an electronic pointing device 19, also for controlling the multimedia authoring program, and for selecting and manipulating multimedia objects appearing on the display, and for creating such objects using conventional graphics design programs. The electronic pointing device 19 can have various embodiments, including a mouse, a touch pad, a joystick, and the like. The electronic pointing device 19 controls a cursor 131 (FIG. 1B) that is used to indicate and select various items on the display 25. An image scanner 21 scans and digitizes information, including text, graphics, photographs, and other objects, producing data files that can be incorporated into a multimedia art work. A MIDI source 23 provides code musical information to the processor 11, for use in enhancing a multimedia work.

The processor 11 is also coupled to a number of output devices including a display 25 for imaging the multimedia art work on a video display terminal, a printer 27 for printing images, text, or other composition appearing on the display 25, a video tape recorder 29 for recording and playing the multimedia art work, a compact disc, read only memory (CD-ROM) recorder 31 for storing the multimedia art work on a CD-ROM for later retrieval, and an audio output device 33 for outputting any recorded audio data included in the multimedia art work.

Figure 1B:
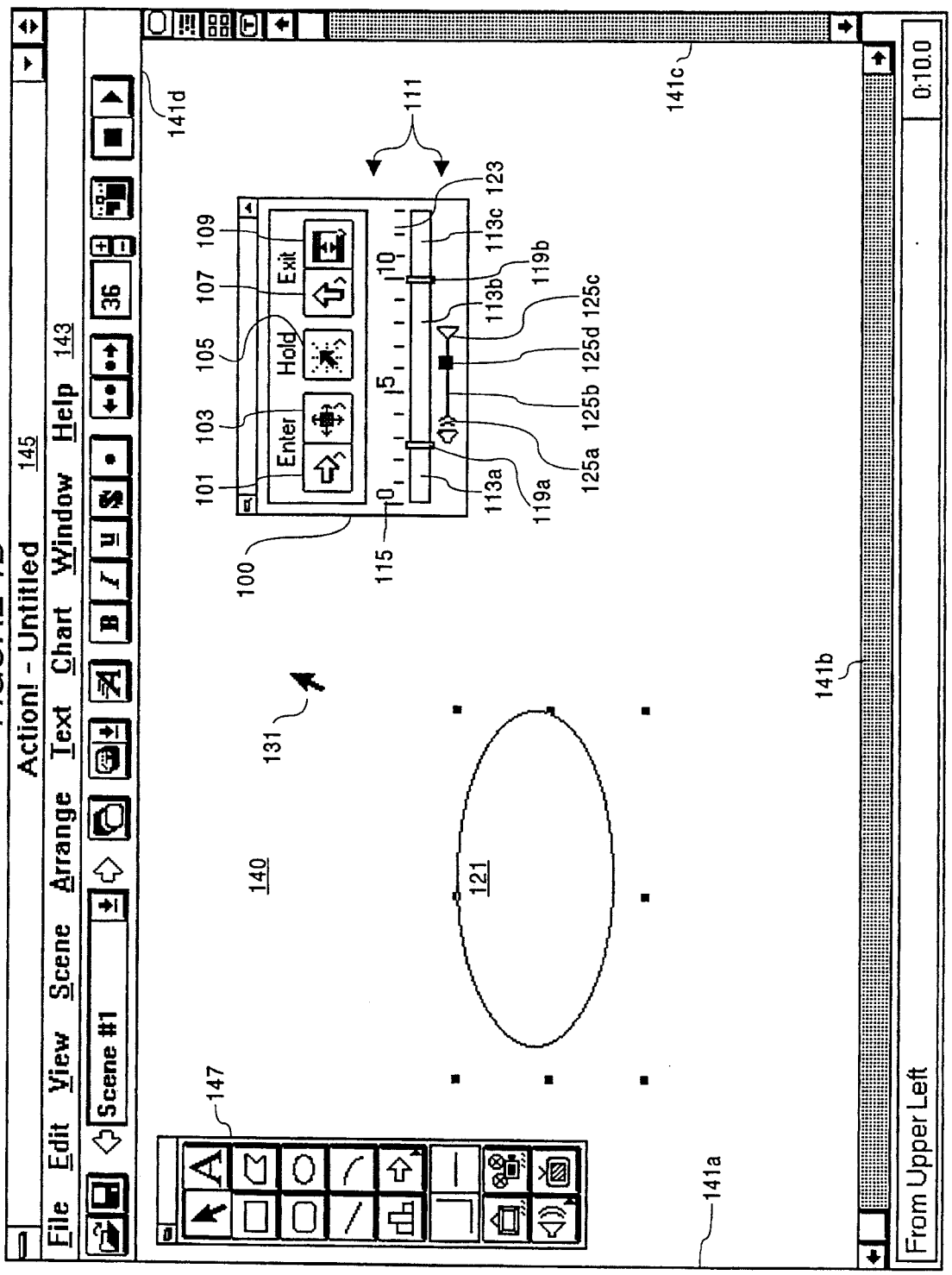
FIG. 1B is an illustration of the multimedia effect tool 100.

FIG. 1B shows the user interface of the multimedia authoring program used in the multimedia authoring system, including the multimedia effect tool 100 of the present invention, as it appears on the display 25. The user interface of the multimedia authoring program includes a window 141 that contains a working area 140 for creating a multimedia art work. The window 141 includes boundaries (141a–d), which delimit the working area 140, and provide a frame of reference for defining the motion of an object 121 in the working area 140. Also, there is a title bar 145, identifying the multimedia art work by name, and menu bar 143 providing a set of commands that can be used to create and manipulate various elements of the multimedia art work. A tool palette 147 provides a variety of conventional tools for creating and manipulating multimedia objects. Also shown in the working area 140 is a typical multimedia object 121, here a simple graphic object. The cursor 131 is used to select various tools on the tool palette 147, objects 121, menu commands from the menu bar 143, and the like. The motion and visual effects described herein can be applied to any multimedia object 121 capable of being shown on the display 25, including text, graphics, video, still photographs, and the like.

In the preferred embodiment, the present invention comprises a multimedia effect tool 100 for applying motion and visual effects to multimedia objects 121. The multimedia effect tool 100 comprises five control groups: an enter control group including an entry motion effect control 101 and an entry motion visual effect control 103; a hold visual effect control 105; an exit control group including an exit motion effect control 107 and an exit motion visual effect control 109; a time segment control group 111; and a sound control group 125. Each of the controls in these groups is represented by icons representing the current settings of the various controls, and can be activated by the electronic pointing device 19 with the cursor 131.

The time segment control group 111 is composed of various icons 113, 119, 123 stored in the memory 13. A time scale 123 shows an indication of the time duration for a selected object 121. The time scale 123 can be set to show either a time scale relative to a scene in the work in which the object 121 appears, or a time scale of the duration of the object 121 (as shown in the example of FIG. 1B). The former time scale would thus include the object duration within a longer time scale, thereby allow the user to manipulate the relative temporal position of the object within the scene time scale. The ability to alternate between scene and object time scales 123 allows the artist to readily determine and control an object timing without the need to manipulate various settings or preferences menus or dialog boxes typically used in multimedia authoring programs. In either form the time scale has an origin 115 that indicates the beginning of either scene including the object 121 in the former case, or the duration of the object 121 in the latter. The time scale 123 is divided into units meaningful to the artist and the intended playback system to allow precise control over the temporal properties of the object 121. In a preferred embodiment the units are seconds and fractions of a second; in alternative embodiments frames or other media specific units may be employed.

Also included in the time control group 111 are contiguous time segments 113, which represent by their relative size their individual duration with respect to the duration of the object 121. There may be any number of time segments 113 associated with an object 121. In one preferred embodiment, there are three time segments 113 associated with each object 121 that useful for coordinating the motion and visual appearance of the object. These are the entry time segment 113a, a hold time segment 113b, and a exit time segment 113c.

Time partitions 119a and 119b separate time segments 113 and delimit the beginning and ending of a given time segment 113. Because a time partition 119 separates two time segments 113, it serves as both the ending time partition 113 of one segment, and the beginning of the next. Thus time partition 119a is the end of the entry time segment 113a, and the beginning of the hold time partition 113b. The icons for the time scale 123, time segments 113, and time partitions 119 are all stored during program operation in the memory 13, and retrieved and updated as needed by the processor 11.

The entry time segment 113a corresponds to the beginning of the appearance of an object 121 on the display 25; the hold time segment 113b corresponds to the duration of the stationary positioning of an object on the display 25, and the exit time segment 113c corresponds to the disappearance of the object from the display. When the time scale 123 is set to show the duration of an object 121, the entry time segment 113a will extend from the origin 115 of the time scale 123 to the first time partition 119a. The hold time segment 113b will then extend for some length of time thereafter, from the first time partition 119a to a second time partition 119b, after which follows the exit time segment 113c lasting until the exit of the object 121 from the work area. In the example of FIG. 1B, the time scale 123 is set to show the duration of the object 121, for which the entry time segment 113a has a duration of about 2.7 seconds, the hold time segment 113b has a duration of about 7.3 seconds, and the exit time segment has a duration of 3 seconds. An object 121 can enter and exit from anywhere on the display 25 as selected by the artist. The duration of each time segment 113 for each object 121 is stored in the multimedia art file in the memory 13 or storage 15.

Figure 5:
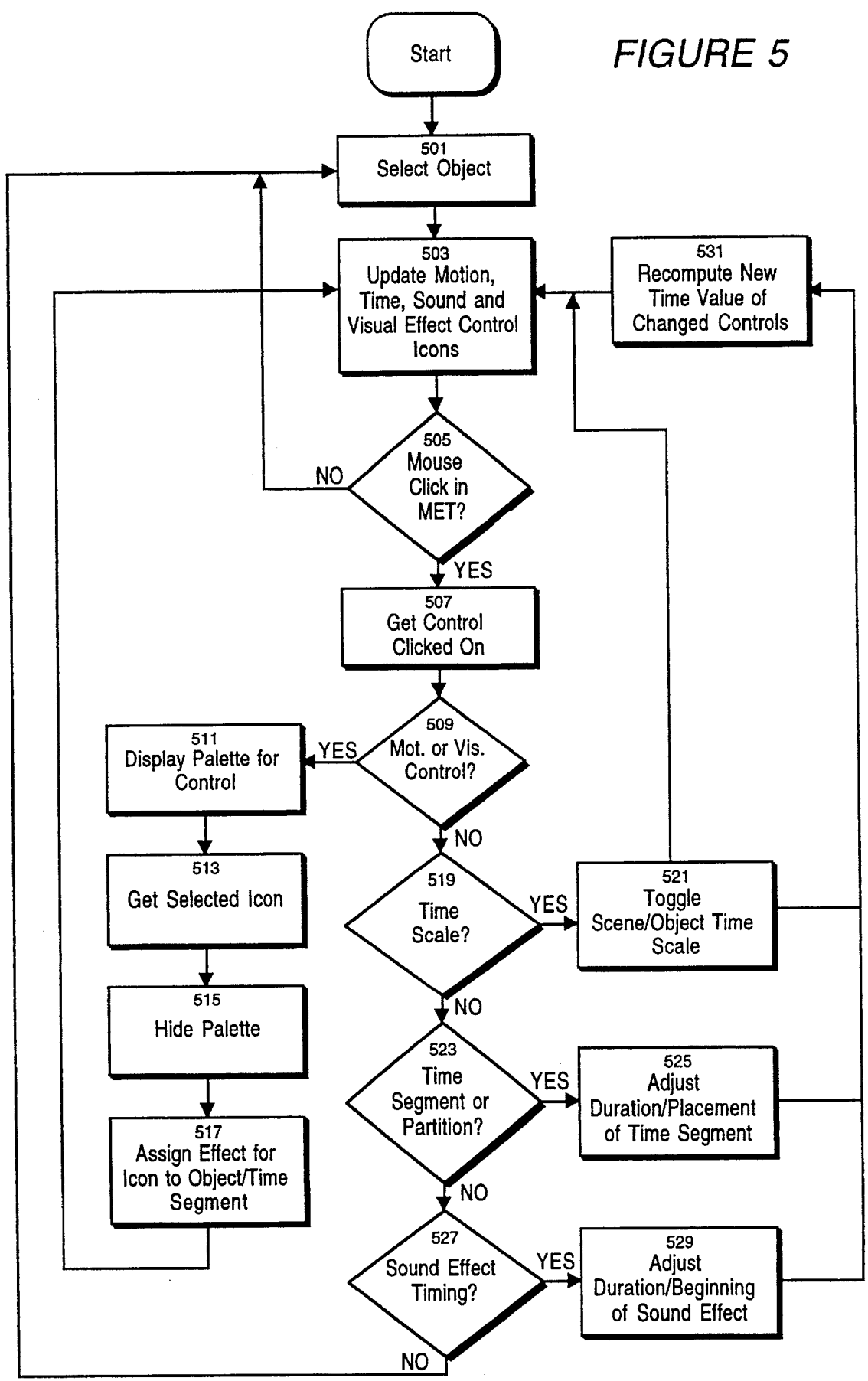
FIG. 5 is a flowchart of the operation of the multimedia effect tool 100.

The time partitions 119 between the time segments 113 can be selected with the electronic pointing device 19 and moved to enlarge or reduce the size of adjacent time segments 113 bordering the time partition 119. Referring to FIG. 5, there is shown a flowchart of the operation of multimedia effect tool 100. First, an object 121 is selected 501, and then the various controls in multimedia effect tool 100 are updated 503 to show the current settings for the object 121. If there is a selection 523 in the time control, then the time segments 113 and partitions 119 are adjusted 525 accordingly, as follows:

A time partition 119 can be selected and moved along the time scale 123. Thus if the time partition 119a is selected and dragged away from the origin 115 of the time scale 123, the duration of time segment 113a increases by a given amount and the duration of time segment 113b decreases by the same amount. The position of these elements is then updated 503 in the multimedia effect tool 100 to indicated their new settings.

Alternatively, if the time scale 123 is set to display the object duration, then the artist can concurrently adjust the duration of a first and third time segment 113 separated by a second time segment 113. This is done by selecting within the area of the second time segment 113 with the electronic pointing device 19 and dragging the second time segment 113 along the time scale 123 towards either the first or third time segments 113. The duration of the selected second time segment 113 is held constant, as the duration of the time segment 113 towards which the second time segment 113 is moved decreases, and the duration of the time segment 113 away from which the second time segment 113 is moved increases, the change in duration of the time segments relative to the amount the second time segment 113 is moved. For example, in FIG. 1B, if the hold time segment 113b is selected and moved towards the entry time segment 113a, then the duration of the entry time segment 113a is decreased, and the duration of the exit time segment 113c is increased by the same amount; the time partitions 119a,b between the time segments 113a,b,c are also moved to indicate the new duration settings. If the time scale 123 is set to display the time for the scene including an object 121, then selecting within a time segment 133 and moving it along the time scale will change the beginning of the appearance of the object 121 on the display relative to the scene time.

These time segment control features allow the user to very rapidly configure the duration of the entry, hold and exit time segments 113, without having to separately and repetitively access multiple menus, dialog boxes, and the like.

Along the bottom of the multimedia effect tool 100 is the sound control group 125. The sound control group 125 comprises a cue control 125a, a duration bar 125b, and a end control 125c. The cue control 125a indicates where, with respect to the time scale 123, a selected sound effect for the object is to begin. This icon can be selected with the electronic pointing device 19 and moved relative to the time scale 123 to set to a cue time for a sound effect. The cue control 125a can be positioned anywhere between the start of the entry time segment 113a and end of the exit time segment 113c of the object 121. The duration bar 125b, shows the relative duration of the sound effect. The end control 125c indicates the ending of the sound effect, and can also be moved with respect to the time scale 123 to set a desired end point. If the chosen duration of the sound effect, as determined from the difference between end control 125c and the cue control 125a, is greater than the duration of the sound effect itself, then the sound effect will "loop" to fill the chosen duration. Each loop is indicated in the duration bar 125b by a tick mark 125d. Otherwise, the sound effect is shortened to fit the chosen duration. The icons 125 used to represent the cue control 125a, the duration bar 125b, and the end control 125c, are retrieved from the memory 13 as needed. The end control 125c may be placed beyond the end of the exit time segment 113c, indicating that the sound effect will persist after the object 121 has left the work area 141. The sound effect may be retrieved from various source, including the CD-ROM reader 31, the mass storage 15, the MIDI source 23, or the memory 13 under the control of the artist.

Referring now to FIG. 2, there is shown a motion effect palette 200 for applying a motion with a direction to a selected object 121. The motion effect palette 200 is displayed in response to selection of the entry motion effect control 101 with the electronic pointing device 19. The motion effect palette 200 is associated with the entry time segment 113a such that all selections made from the palette effect the object 121 during its entry time segment 113a. Selection of the exit motion effect control 107 causes an identical second motion effect palette to appear which is associated only with the exit time segment 113c. Accordingly the description of the operation of the first motion effect palette 200 with respect to the entry time segment 113a applies to the motion effect palette in its association with the exit time segment 113c, and exit motion control 109. The icon shown for each the entry motion effect control 101 and the exit motion effect control 109 indicates the current motion effect setting for the entry and exit time segments 113a, 113c of the selected object, thereby allowing the artist to readily and visually determine these settings without accessing a number of different menus, or dialog boxes.

The motion effect palette 200 contains a set of motion direction icons 201, each indicating a motion with a direction that can be applied to the object 121 in the entry time segment 113a. These icons 201 are retrieved from the motion direction icons 201 stored in the memory 13 when the motion effect palette 200 is displayed. In the preferred embodiment there are nine motion direction icons 201, eight of which represent the directions from 0° to 315° in 45° increments (motion direction icons 201(a–h)), and the ninth representing no movement, i.e., stationary positioning of the object 121 during the entry time segment 113a. The direction of motion represented by a motion direction icon 201 when applied to the object 121 by the processor 11 will move the object from outside or within the work area 141 in the represented direction so that it arrives at the position in the work area 141 associated with the beginning of the next time segment 113. The speed of movement is determined from the distance to be traveled and the allotted time indicated by the entry time segment 113a. Thus motion direction icon 201a indicates movement from the current location of the object 121 at an angle of 270°, icon 201e represents movement at 180°, or right to left, and icon 201i represents no motion at all. In alternate embodiments, a greater number of directions of motion can be represented by a larger number of motion direction icons 201, such as every 30°, or curvilinear motion could also be represented and applied to the object 121.

In the preferred embodiment, the motion direction icons 201 are arranged such that the direction of motion they represent with respect to the boundary of the motion effect palette 200 is the same as the intended motion of the object 121 with respect to the boundary 141 of the working area 140. Thus, just as motion direction icon 201(f) indicates a motion from the upper right corner of the palette 200 to the center, so then the object 121 will move in that direction (it should be noted that the object need not begin in motion in the upper right corner of the display 25, but only that it moves in a direction from upper right to lower left).

Referring now to FIG. 5, there is shown the process of applying a particular motion of direction to an object 121. The artist selects 501 the object 121 with the electronic pointing device 19. The multimedia effect tool 100 is updated 503 with the appropriate icons to show the current settings for the various effects. Selecting 505 on the entry motion effect control 101 activates 511 the display of the motion effect palette 200. Once the palette 200 is displayed 511, the artist selects 513 with the electronic pointing device 19 a motion direction icon 201 representative of the desired motion. An icon 201 is highlighted to indicate its selection, thus icon 201h is highlighted in FIG. 2 as an example of a selected icon. Because the motion effect palette 200 is already associated with the entry time segment 113, there is no need for the artist to separately select a time segment 113 for applying the motion direction effect, thereby reducing the number of actions necessary for implementing the effect.

Once the selection is made, the palette 200 is hidden 515, and the direction represented by a selected motion direction icon 201 is stored 517 in the memory 13 with the associated object 121 and time segment 113. The entry motion effect control 101 is updated 503 with the selected icon to show the new motion effect for the entry time segment 113a.

When the multimedia art work is activated, the assigned effect for the object is passed using conventional programming techniques to a motion direction setting procedure 39 also stored in the memory 13. The motion direction setting procedure 39 applies the selected direction of motion to the object 121 in the associated time segment 113, here the entry time segment 113a since the entry motion effect palette 200 is activated. The object 121 will appear at a selected location at a designated time relative to the beginning of the work, and will move during its entry time segment 113a across the display 25 in the direction of motion associated with the entry time segment 113a. The motion of the object 121 will stop at the position selected by the artist for the beginning of the next time segment 113, which in this embodiment is the hold time segment 113b.

As noted above, there is a corresponding motion control palette associated with the exit motion effect control 109 for selecting a motion direction icon and applying a particular direction of motion to the object during its exit time segment 113c, and it operates in the same manner as the entry motion effect control 109.

As discussed above, visual effects form an integral part of a multimedia art work. In FIG. 3, there is shown the visual effect palette 300 for controlling the visual effects associated with a multimedia object 121. The palette 300 is displayed in response to selection of the entry visual effect control 103 by the electronic pointing device 19, and is associated with the entry time segment 113a in the same manner as the motion effect palette 200. Selection of the exit visual effect control 109 also displays an identical visual effect palette, again associated with the exit time segment 113c. The icon shown for each of the entry and exit visual effect controls 103, 109 indicates the current setting of each visual effect control for the associated time segments 113, again allowing rapid visual determination of settings.

The visual effect palette 300 is composed of an array of visual effect icons 305, segregated into visual effect families, 303a–h. These icons 305 are retrieved from the visual effect icons 305 stored in the memory 13 when the visual effect palette 300 is displayed. Each visual effect family 303a–h has a corresponding visual effect identifier 301a–h which describes the common nature of the family. For example, visual effect family 303b has the visual effect identifier "Wipe," indicating that all icons 305a in the family identify various types of wipe effects. The visual effect icons 305 in each family 303 represent different variations of the basic visual effect of the family 303. Thus visual effect icon 305(b)(1) represents a "wipe left" wipe effect. Visual effect icon 305(h)(3) represents a "grow vertical from center" effect for the "Grow" family 303h. Visual effect icon 305(a)(1) represents the absence of any visual effect for the entry time segment 113a. The arrangement of the visual effect icons 305 into families 303, along with the visual effect identifiers 301, allows the artist to easily locate a desired type of visual effect using both graphical and native language clues, reducing the amount of time and hand movements necessary to select a desired visual effect.

Referring now to FIG. 5, there is shown the process of applying a particular visual effect to an object 121. The artist selects 501 the object 121 with the electronic pointing device 19. The multimedia effect tool 100 is updated 503 with the appropriate icons to show the current settings for the various effects, including the entry and exit visual effects. Selecting 505 on the entry visual effect control 101 activates 511 the display of the visual effect palette 300. Once the palette 300 is displayed 511, the artist selects 513 with the electronic pointing device 19 a visual effect icon 305 representative of the desired motion. An icon 305 is highlighted to indicate its selection. As with the motion effect palette 100, the visual effect palette 300 is already associated with the entry time segment 113, and there is no need for the artist to separately select a time segment 113 for applying the motion direction effect, again reducing the number of actions necessary for implementing the effect.

Once the selection is made, the palette 300 is hidden 515, and the visual effect represented by a selected visual effect icon 305 is stored 517 in the memory 13 with the associated object 121 and time segment 113. The entry visual effect control 103 is updated 503 with the selected icon to show the new visual effect for the entry time segment 113a.

When the multimedia art work is activated, the assigned visual effect for the object is passed using conventional programming techniques to a visual effect setting procedure 41 also stored in the memory 13. The visual effect setting procedure 41 applies the selected visual effect to the object 121 in the associated time segment 113. The object 121 will appear at a selected location at a designated time relative to the beginning of the work, and will move during its entry time segment 113a across the display 25 in the direction of motion associated with the entry time segment 113a. When the multimedia art work is activated, the object 121 will appear at a selected location at a designated time relative to the beginning of the work with the visual effect stored for the object 121 during the time segment 113. In the preferred embodiment, if there is a selected motion for time segment 113, then the visual effect is applied while the object 121 moves as directed. As noted above, there is a corresponding visual effect control palette associated with the exit visual effect control 109 for selecting a visual effect icon and applying a particular visual effect to the object during its exit time segment 113c.

Referring to FIG. 4, there is shown the hold visual effect palette 400 for applying visual effects to the object during its hold time segment 113b. The hold visual effect control 105 is used similarly to the entry and exit visual effect controls 103, 109, and displays the hold visual effect palette 400 when selected with the cursor 131 by the electronic pointing device 19. Here too, the icon shown for the hold visual effect control 105 indicates the current visual effect setting for the hold time segment 113b. The hold visual effect palette 400 contains an array of visual effect icons 405, again arranged in visual effect families 403, each family containing icons 405 representing variations of a given type of visual effect. For each visual effect family 403 there is a visual effect identifier 401. The icons are stored in the memory 13 with the other visual effect icons 305. The selection and operation of the hold visual effect control 105, palette 400, and icons 405 is the same as with the other visual effect palettes, as illustrated in FIG. 5. However, the visual effects represented on the hold visual effects palette 400 in the preferred embodiment are different from those on the entry and exit visual effect palettes. They are designed to be more useful as a visual effect when the object 121 is stationary on the display 25, and include visual effects that attract a viewer's attention (sparkling and shimmering) without occluding any portion of the object, as with the visual effects associated with the entry and exit visual effect palettes. In alternate embodiments, any type of visual effect can be include in the entry, hold, and exit visual control palettes.

We claim:

1. A computer user interface apparatus for controlling a motion effect and a visual effect of an object in a computer system, comprising:

a memory means, for storing at least one object, including a motion effect and a visual effect, wherein each object includes an object duration between an appearance of the object and a disappearance of the object, the object duration stored in the memory means with the object;

a processor, operatively coupled to the memory means, for retrieving the object from the memory means, and manipulating the object;

a display, operatively coupled to the processor and the memory means, for displaying the object and the motion effect and visual effect of the object;

an electronic pointing means operatively coupled to the processor, for selecting and manipulating the object on the display:

a plurality of motion direction indicating means responsive to selection by the electronic pointing means, and displayable on the display, each motion direction indicating means representing a motion effect with a direction applied to the object by the processor, wherein the motion effect is stored by the processor in the memory means with the object;

a motion direction setting means operatively coupled to the processor the display, and the memory means, for controlling the processor to apply to the object the motion effect stored with the object in the memory, wherein the object is displayed on the display with the stored motion effect;

a plurality of visual effect indicating means responsive to selection by the electronic pointing means, and displayable on the display, each visual effect indicating means representing a visual effect applied to the object by the processor, wherein the visual effect is stored by the processor in the memory means with the object;

a visual effect setting means operatively coupled to the processor, the display, and the memory means, for controlling the processor to apply to the object the visual effect stored with the object in the memory, wherein the object is displayed on the display with the stored visual effect:

means, operatively coupled to the display, and the processor, for displaying on the display a motion control palette including the plurality of motion direction indicating means;

means, operatively coupled to the display, and the processor, for displaying on the display a visual effect palette including the plurality of visual effect indicating means;

duration display means, operatively coupled to the display and the memory means, for displaying on the display an indicator of the object duration of the object;

segmenting means, operatively coupled to the memory means and the display, for segmenting on the display the object duration of the object into a plurality of contiguous time segments, each time segment comprising a beginning time partition and an end time partition, and a segment duration between the time partitions, each time segment including a visual effect applied by the visual effect setting means, the means for segmenting the object duration responsive to selection by the electronic pointing means, and for storing each time segment with the object in the memory means;

first adjusting means, operatively coupled to the memory means and the display, for concurrently adjusting on the display the segment duration of a first time segment and a third time segment separated by a second time segment adjacent to both the first and third time segments, by moving with the electronic pointing means the second time segment toward either the first or third time segment, such that the segment duration of each of the first and third time segments changes relative to the movement of the second time segment, and for storing each time segment with the object in the memory means; and second adjusting means, operatively coupled to the memory means and the display, for concurrently adjusting on the display the segment duration of both the first and second time segments by moving a time partition separating the first and second time segments with the electronic pointing means, such that the segment duration of each of the first and second time segments changes relative to the movement of the time partition, and for storing each time segment with the object in the memory means.

2. The apparatus of claim 1 wherein the concurrent adjustment of the segment durations of each of the first and third time segments by the first adjusting means comprises:

increasing the segment duration of the first time segment, and decreasing the segment duration of the third time segment as the second time segment moves away from the first time segment and towards the third time segment, and holding the segment duration of the second time segment constant; and decreasing the segment duration of the first time segment and increasing the segment duration of the third time segment as the second time segment moves toward the first time segment and away from the third time segment, and holding the segment duration of the second time segment constant.

3. The apparatus of claim 1 wherein the concurrent adjustment of the segment durations of each of the first and second time segments by the second adjusting means comprises:

increasing the segment duration of the first time segment and decreasing the segment duration of the second time segment as the time partition moves away from the first time segment and towards the second time segment; and decreasing the segment duration of the first time segment and increasing the segment duration of the second time segment as the time partition moves towards the first time segment and away from the second time segment.

4. The apparatus of claim 1, wherein the plurality of contiguous time segments includes an entry time segment and an exit time segment, and wherein the entry and exit time segments each includes a motion with a direction applied by the motion direction setting means.

5. The apparatus of claim 1, wherein at least one of the plurality of contiguous time segments is a hold time segment for positioning the object at a fixed location on the display.

6. A user interface for a computer system for controlling a motion effect and a visual effect of an object that is displayable on a display controlled by a computer system, the computer system including a memory for storing the object, the motion effect, and the visual effect, the user interface comprising;

a display, operatively coupled to the computer system, for displaying the object;

an electronic pointing means coupled to the computer system for selecting one of a plurality of motion direction icons displayed within a motion control palette on the display, each motion direction icon representing a motion effect with a direction relative to the boundary, and selectable by the electronic pointing means, wherein the motion effect is stored in the memory, and for selecting one of a plurality of visual effect icons displayed within a visual effect palette on the display, each visual effect icon representing a visual effect applicable to the object, and selectable by the electronic pointing means, wherein the visual effect is stored in the memory;

a motion direction setting means, operatively coupled to the computer system, for applying the stored motion effect to the object on the display;

a visual effect setting means, operatively coupled to the computer systems, for applying the stored visual effect to the object on the display;

duration display means, operatively coupled to the display, for displaying on the display an indicator of the object duration of the object;

segmenting means, operatively coupled to the memory and the display, for segmenting on the display the object duration of the object into a plurality of contiguous time segments, each time segment comprising a beginning time partition and an end time partition, and a segment duration between the time partitions, each time segment including a visual effect applied by the visual effect setting means, the means for segmenting the object duration responsive to selection by the electronic pointing means, and for storing each time segment with the object in the memory;

first adjusting means, operatively coupled to the memory and the display, for concurrently adjusting on the display the segment duration of a first time segment and a third time segment separated by a second time segment adjacent to both the first and third time segments, by moving with the electronic pointing means the second time segment toward either the first or third time segment, such that the segment duration of each of the first and third time segments changes relative to the movement of the second time segment, and for storing each time segment with the object in the memory; and second adjusting means, operatively coupled to the memory and the display, for concurrently adjusting on the display the segment duration of both the first and second time segments by moving a time partition separating the first and second time segments with the electronic pointing means, such that the segment duration of each of the first and second time segments changes relative to the movement of the time partition, and for storing each time segment with the object in the memory.

7. The apparatus of claim 6 wherein the concurrent adjustment of the segment durations of each of the first and third time segments by the first adjusting means comprises:

increasing the segment duration of the first time segment, and decreasing the segment duration of the third time segment as the second time segment moves away from the first time segment and towards the third time segment, and holding the segment duration of the second time segment constant; and decreasing the segment duration of the first time segment and increasing the segment duration of the third time segment as the second time segment moves toward the first time segment and away from the third time segment, and holding the segment duration of the second time segment constant.

8. The apparatus of claim 6 wherein the concurrent adjustment of the segment durations of each of the first and second time segments by the second adjusting means comprises:

increasing the segment duration of the first time segment and decreasing the segment duration of the second time segment as the time partition moves away from the first time segment and towards the second time segment; and decreasing the segment duration of the first time segment and increasing the segment duration of the second time segment as the time partition moves towards the first time segment and away from the second time segment.

9. In a computer based multimedia authoring environment, including an electronic pointing device, a display, and a memory for storing at least one multimedia object, the authoring environment for creating a multimedia art work including the multimedia object, a computer implemented method for applying a multimedia effect to an object comprising the steps of:

displaying at least one object on the display;

receiving a selection of the object with the electronic pointing device;

displaying a plurality of motion direction icons, each motion direction icon representing a motion effect with a direction;

receiving a selection of one of the motion direction icons with the electronic pointing device;

storing the motion effect with a direction represented by the selected motion direction icon in association with the object in the memory;

displaying a motion direction setting icon indicating the stored motion effect for the object;

displaying a plurality of visual effect icons, each visual effect icon representing a visual effect altering the appearance of the object;

receiving a selection of one of the visual effect icons with the electronic pointing device;

storing the selected visual effect with the object in the memory;

displayiny a visual effect setting icon indicating the stored visual effect for the object; and concurrently moving the object on the display in the direction represented by the selected motion direction icon and displaying the object with stored visual effect.

10. The method of claim 9, further comprising:

displaying a time scale having an origin representing the appearance of the object on the display;

displaying on the time scale a cue point icon for a cue point of a sound effect stored in the memory in association with the object, the cue point icon displayed relative to the origin of the time scale;

receiving a user input adjusting on the display with the electronic pointing device the cue point icon of the sound effect, and storing the adjusted cue point in association with the sound effect in the memory;

displaying on the time scale an end point icon for an end point of the sound effect, the end point icon displayed relative to the origin of the time scale; and receiving a user input from the electronic pointing device that adjusts on the display the end point icon of the sound effect, and storing the adjusted end point icon in association with the sound effect in the memory.

11. The method of claim 10, further comprising:

responsive to an actual duration of the sound effect being less than a duration between the cue point and the end point of the sound effect, displaying at least one loop indicator icon between the cue point icon and the end point icon on the time scale at a position corresponding to the actual duration of the sound effect.

12. The method of claim 9, further comprising:

displaying the plurality of motion direction icons in a first palette in response to a first user input to the motion direction setting icon; and, displaying the plurality of visual effect icons in a second palette in response to a second user input to the visual effect setting icon.

13. The method of claim 9, wherein the plurality of visual effect icons in the second palette are arranged to form an array including a plurality of visual effect families, each visual effect family having selected visual effect icons representative of visual effects within the visual effect family.

14. The method of claim 9, wherein each object includes an object duration between an appearance of the object and a disappearance of the object, the object duration stored in the memory with the object, the object duration comprised of a plurality of contiguous time segments, each time segment having a duration, and represented by a time segment icon having a size, the method further comprising:

displaying a plurality of time segment icons along a common time scale;

associating a motion effect with at least one time segment icon for the selected object so that the object moves during the time segment of the time segment icon with the direction of the motion effect;

associating a visual effect with at least one time segment icon for the selected object so that the object appears with the visual effect during the time segment of the time segment icon;

for the selected object, receiving a user input to a time segment icon associated therewith adjusting the duration of the time segment of the time segment icon from a first duration to a second duration, and, displaying the motion and the visual effect of the selected object for the second duration of the selected time segment.

15. The method of claim 14, wherein the plurality of time segment icons include a first time segment icon and a second time segment icon respectively associated with contiguous first and second time segments, the method further comprising:

displaying a time partition icon between the first time segment icon and the second time segment icon;

responsive to a user input moving the time partition icon away from an origin of the time scale, increasing the duration of the first time segment and equally decreasing the duration of the second time segment icon, and increasing the size of the first time segment icon and equally decreasing the size of the second time segment icon; and, responsive to a user input moving the time partition icon toward the origin of the time scale, decreasing the duration of the first time segment and equally increasing the duration of the second time segment icon, and decreasing the size of the first time segment icon and equally increasing the size of the second time segment icon.

16. The method of claim 14, wherein the plurality of time segment icons include a first, second, and third time segment icon, respectively associated with contiguous first, second, and third time segments, the method further comprising:

responsive to a user input moving the second time segment icon away from an origin of the time scale, increasing the duration of the first time segment and equally decreasing the duration of the third time segment, and increasing the size of the first time segment icon and equally decreasing the size of the third time segment icon, while holding the duration of the second time segment and the size of the second time segment icon constant; and, responsive to a user input moving the second time segment icon toward the origin of the time scale, decreasing the duration of the first time segment and equally increasing the duration of the third time segment, and decreasing the size of the first time segment icon and equally increasing the size of the third time segment icon, while holding the duration of the second time segment and the size of the second time segment icon constant.

17. In a computer based multimedia authoring environment, including an electronic pointing device, a display, and a memory for storing at least one multimedia object, the authoring environment for creating a multimedia art work including the multimedia object, wherein each object includes an object duration between an appearance of the object and a disappearance of the object, the object duration including a plurality of contiguous time segments, each time segment comprising a beginning time partition and an end time partition, and a segment duration between the time partitions, a method for applying a multimedia effect to an object comprising:

displaying at least one object on the display;

selecting the object with the electronic pointing device;

displaying a first palette including a plurality of motion direction icons, each motion direction icon representing a motion effect with a direction;

selecting a motion direction icon on the first palette with the electronic pointing device;

storing the motion effect with a direction represented by the elected motion direction icon in association with the object in the memory;

moving the object on the display in the direction represented by the selected motion direction icon;

displaying on the display the object duration of the object, including the time segments and time partitions;

concurrently adjusting on the display the segment duration of a first time segment and a third time segment separated by a second time segment adjacent to both the first and third time segments, by moving with the electronic pointing device the second time segment toward either the first or third time segment such that the segment duration of each of the first and third time segments changes relative to the movement of the second time segment; and concurrently adjusting on the display the segment duration of both the first and second time segments by moving with the electronic pointing device a time partition separating the first and second time segments with the electronic pointing means, such that the segment duration of each of the first and second time segments changes relative to the movement of the time partition.

18. The method of claim 17 wherein concurrently adjusting the segment durations of each of the first and third time segments further comprises:

increasing the segment duration of the first time segment, and decreasing the segment duration of the third time segment as the second time segment moves away from the first time segment and towards the third time segment, and holding the segment duration of the second time segment constant; and, decreasing the segment duration of the first time segment and increasing the segment duration of the third time segment as the second time segment moves toward the first time segment and away from the third time segment, and holding the segment duration of the second time segment constant.

19. The method of claim 17 wherein concurrently adjusting of the segment durations of each of the first and second time segments further comprises:

increasing the segment duration of the first time segment and decreasing the segment duration of the second time segment as the time partition moves away from the first time segment and towards the second time segment; and decreasing the segment duration of the first time segment and increasing the segment duration of the second time segment as the time partition moves towards the first time segment and away from the second time segment.

20. In a computer system comprising a memory adapted to store an object, including a motion effect and a visual effect, a processor operatively coupled to the memory and adapted to retrieve the object from the memory, a display operatively coupled to the processor and the memory, said display adapted to display the object and the motion effect and visual effect of the object, and an electronic pointing device operatively coupled to the processor, and adapted to select and manipulate the object on the display, a computer user interface apparatus for controlling a motion effect and a visual effect of an object, said interface comprising:

a motion effect indicator icon stored in the memory and displayed on the display, which in response to a first user input displays a plurality of motion direction icons, and which in response to a second user input that selects one of the displayed motion direction icons, displays the selected motion direction icon;

wherein each motion direction icon represents a motion effect with a direction applicable to the object by the processor, each motion direction icon displayed on the display in response to the first user input to the motion effect indicator icon, and responsive to selection by the second user input, wherein the motion effect of a selected motion direction icon is stored by the processor in the memory in association with the object;

a plurality of motion direction setting instructions stored in the memory to control the processor to apply to the object the stored motion effect, such that the object is subsequently displayed on the display with the stored motion effect to move the object in the direction represented by the motion direction icon;

a visual effect indicator icon stored in the memory and displayed on the display, which in response to a third user input displays a plurality of visual effect icons, and which in response to a fourth user input that selects one of the displayed visual effect icons of a visual effect icons, displays the selected visual effect icon;

wherein each visual effect icon represents a visual effect applied to the object by the processor, each visual effect icon displayed on the display in response to the third user input to the visual effect indicator icon, and responsive to selection by the fourth user input, wherein the visual effect of a selected visual effect icon is stored by the processor in the memory in association with the object; and, a plurality of visual effect setting instructions stored in the memory to control the processor to apply to the object the stored visual effect, wherein the object is displayed on the display with the stored visual effect.

21. The apparatus of claim 20, wherein:

in response to the first user input the processor displays on the display a motion control palette including the plurality of motion direction icons; and, in response to the third user input the processor displays on the display a visual effect palette including the plurality of visual effect icons.

22. The apparatus of claim 21, wherein the plurality of visual effect icons in the visual effect palette are arranged to form an array including a plurality of visual effect families, each visual effect family having selected visual effect icons representative of visual effects within the visual effect family.

23. The apparatus of claim 21, wherein each object includes an object duration between an appearance of the object and a disappearance of the object, the object duration stored in the memory with the object, the apparatus further comprising:

a duration display indicator, operatively coupled to the display and the memory, for displaying on the display an indicator of the object duration of the object;

segmenting instructions to control the processor to segment on the display the object duration of the object into a plurality of contiguous time segments, each time segment comprising a beginning time partition and an end time partition, and a segment duration between the time partitions, each time segment including a visual effect applied by the visual effect setting instructions, a duration of the visual effect for a time segment being the segment duration, the segmenting instructions responsive to selection by the electronic pointing device, and for storing each time segment with the object in the memory;

first adjusting instructions to control the processor to adjust on the display the segment duration of a time segment by moving the time segment with the electronic pointing device along a time scale having an origin towards a time partition, wherein the segment duration increases as the time segment moves toward its end time partition, and the segment duration decreases as the time segment moves toward its beginning time partition, and to store each time segment in association with the object in the memory; and, second adjusting instructions to control the processor to adjust on the display the segment duration of a time segment by moving a time partition along the axis with the electronic pointing device, the segment duration changing relative to the movement of the time partition with respect to the origin of the time scale, and to store each time segment in association with the object in the memory.

24. The apparatus of claim 23 wherein the plurality of time segments includes first, second, and third contiguous time segments, the concurrent adjustment of the segment durations of the first and third time segments by the first adjusting instructions comprises:

increasing the segment duration of the first time segment, and decreasing the segment duration of the third time segment as the second time segment moves away from the first time segment and towards the third time segment, and holding the segment duration of the second time segment constant; and, decreasing the segment duration of the first time segment and increasing the segment duration of the third time segment as the second time segment moves toward the first time segment and away from the third time segment, and holding the segment duration of the second time segment constant.

25. The apparatus of claim 23 wherein the plurality of time segments includes first and second contiguous time segments, and wherein the concurrent adjustment of the segment durations of each of the first and second time segments by the second adjusting instructions comprises:

increasing the segment duration of the first time segment and decreasing the segment duration of the second time segment as the time partition moves away from the first time segment and towards the second time segment; and decreasing the segment duration of the first time segment and increasing the segment duration of the second time segment as the time partition moves towards the first time segment and away from the second time segment.

26. The apparatus of claim 23, wherein the plurality of contiguous time segments includes an entry time segment and an exit time segment, and wherein the entry and exit time segments each includes a motion with a direction applied by the motion direction setting instructions, and a visual effect applied by the visual effect setting instructions.

27. The apparatus of claim 23, wherein at least one of the plurality of contiguous time segments is a hold time segment for positioning the object at a fixed location on the display.

28. The apparatus of claim 21, wherein each object includes an object duration between an appearance of the object and a disappearance of the object, the object duration stored in the memory with the object, the apparatus further comprising:

a time scale, having an origin, displayed on the display to visually indicate the object duration of the object, the object duration comprising a plurality of contiguous time segments represented by time segments icons, each time segment icon delimited by two time partition icons, the two time partition icons of a time segment being a beginning time partition icon and an ending time partition icon, each time segment having a segment duration and associated with a visual effect, a duration of the visual effect for a time segment being the segment duration of the time segment;

wherein the plurality of time segments includes an entry time segment, the beginning time partition icon of which defines with respect to the time scale the appearance of the object on the display, and an exit time segment, the ending time partition icon of which defines with respect to the time scale the disappearance of the object from the display;

for any three contiguous time segments including a first, second, and third time segment respectively associated with first, second, and third time segment icons, the segment durations of the first and third time segments concurrently adjustable on the display by moving the second time segment icon with the electronic pointing device along the time scale, the segment duration of the first time segment changing by an amount that is opposite an amount of change of the segment duration of the third time segment, the segment duration of the second time segment remaining constant; and, for any two contiguous time segments including a fourth and fifth time segment, the segment duration of the fourth and fifth time segments concurrently adjustable on the display by moving a time partition between fourth and fifth time segment icons along the time scale with the electronic pointing device, the segment duration of the fourth and fifth time segments changing relative to the movement of the time partition with respect to the origin of the time scale.

29. The apparatus of claim 28 wherein concurrent adjustment of the segment durations of the first and third time segments comprises:

increasing the segment duration of the first time segment, and decreasing the segment duration of the third time segment as the second time segment icon moves away from the first time segment icon and towards the third time segment icon, and holding the segment duration of the second time segment constant; and, decreasing the segment duration of the first time segment and increasing the segment duration of the third time segment as the second time segment icon moves toward the first time segment icon and away from the third time segment icon, and holding the segment duration of the second time segment constant.

30. The apparatus of claim 28 wherein the concurrent adjustment of the segment durations of the fourth and fifth time segments comprises:

increasing the segment duration of the fourth time segment and decreasing the segment duration of the fifth time segment as the time partition between the fourth and fifth time segment icons moves away from the fourth time segment icon and towards the fifth time segment icon; and decreasing the segment duration of the fourth time segment and increasing the segment duration of the fifth time segment as the time partition between the fourth and fifth time segment icons moves towards the fourth time segment icon and away from the fifth time segment icon.

31. The apparatus of claim 20, wherein a sound effect, having a duration, a cue point representing the beginning of the sound effect, and an end point representing the end of the sound effect, is available in the memory for association with the object, the system further comprising:

a cue point adjusting icon displayed on the display that indicates the cue point of the sound effect relative to an appearance of the object and that is responsive to a fifth user input to adjust the cue point of the sound effect and to store the cue point in association with the sound effect in the memory; and an end point adjusting icon displayed on the display that indicates the end point of the sound effect relative to the disappearance of the object from the display and that is responsive to a sixth user input to adjust the end point and to store the end point in association with the sound effect in the memory, wherein a difference between the end point of the sound effect and the cue point determines the duration of the sound effect.

* * * * *